(12) United States Patent
Nagy et al.

(10) Patent No.: US 8,392,554 B2
(45) Date of Patent: Mar. 5, 2013

(54) SYSTEM AND METHOD OF REMOTELY LOCATING A LOST MOBILE COMMUNICATION DEVICE

(75) Inventors: Tom Nagy, Waterloo (CA); Russell N. Owen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 2676 days.

(21) Appl. No.: 11/036,666

(22) Filed: Jan. 14, 2005

(65) Prior Publication Data

US 2006/0161628 A1    Jul. 20, 2006

(51) Int. Cl.
*G06F 15/173* (2006.01)
(52) U.S. Cl. .................. 709/224; 709/221
(58) Field of Classification Search .......... 709/217, 709/218, 219, 220, 221, 224; 455/420
See application file for complete search history.

(56) References Cited

U.S. PATENT DOCUMENTS

| | | | |
|---|---|---|---|
| 6,300,863 B1 * | 10/2001 | Cotichini et al. ........ | 340/5.8 |
| 2004/0180673 A1 | 9/2004 | Adams et al. | |
| 2004/0203601 A1 | 10/2004 | Morriss et al. | |
| 2005/0186954 A1 * | 8/2005 | Kenney ............. | 455/420 |

FOREIGN PATENT DOCUMENTS

EP    0724244 A    7/1996

OTHER PUBLICATIONS

Extended European Search Report, issued by European Patent Office on Feb. 11, 2008, for Application No. EP07120185.9.

* cited by examiner

*Primary Examiner* — Patrice Winder
*Assistant Examiner* — Joseph Greene
(74) *Attorney, Agent, or Firm* — Jones Day

(57) ABSTRACT

A system and method of locating a lost wireless communication device is provided. A remote server is contacted to indicate that the wireless communication device is lost. A lost device policy setting is then activated in a database coupled to the remote server, the lost device policy setting indicating that the wireless communication device is lost. In response to activation of the lost device policy setting, a remote location command is then transmitted from the remote server to the wireless communication device via a wireless network. The remote location command is subsequently received at the lost wireless communication device, which processes the remote location command such that a user of the wireless communication device can locate the device.

21 Claims, 3 Drawing Sheets

SYSTEM AND METHOD OF REMOTELY LOCATING A LOST MOBILE COMMUNICATION DEVICE

Modern mobile communication devices have many alerting or notification mechanisms, such as an audible ring tone, visible signal, vibration motor, etc. Oftentimes, however, users of these devices will disable some or all of these notification mechanism. For example, if the user is in a movie theatre, it is common practice to turn off these notification mechanisms so as not to disturb the other movie patrons. There are many other examples of situations where the user may disable the device notifications. Subsequently, then, if the user misplaces their device (with the notifications disabled) it may become difficult to locate the device. This application is directed to solving the problem of how to locate a lost mobile communication device, particularly when the device notifications have been disabled by the user.

THE DRAWINGS

DETAILED DESCRIPTION

Figure 1:
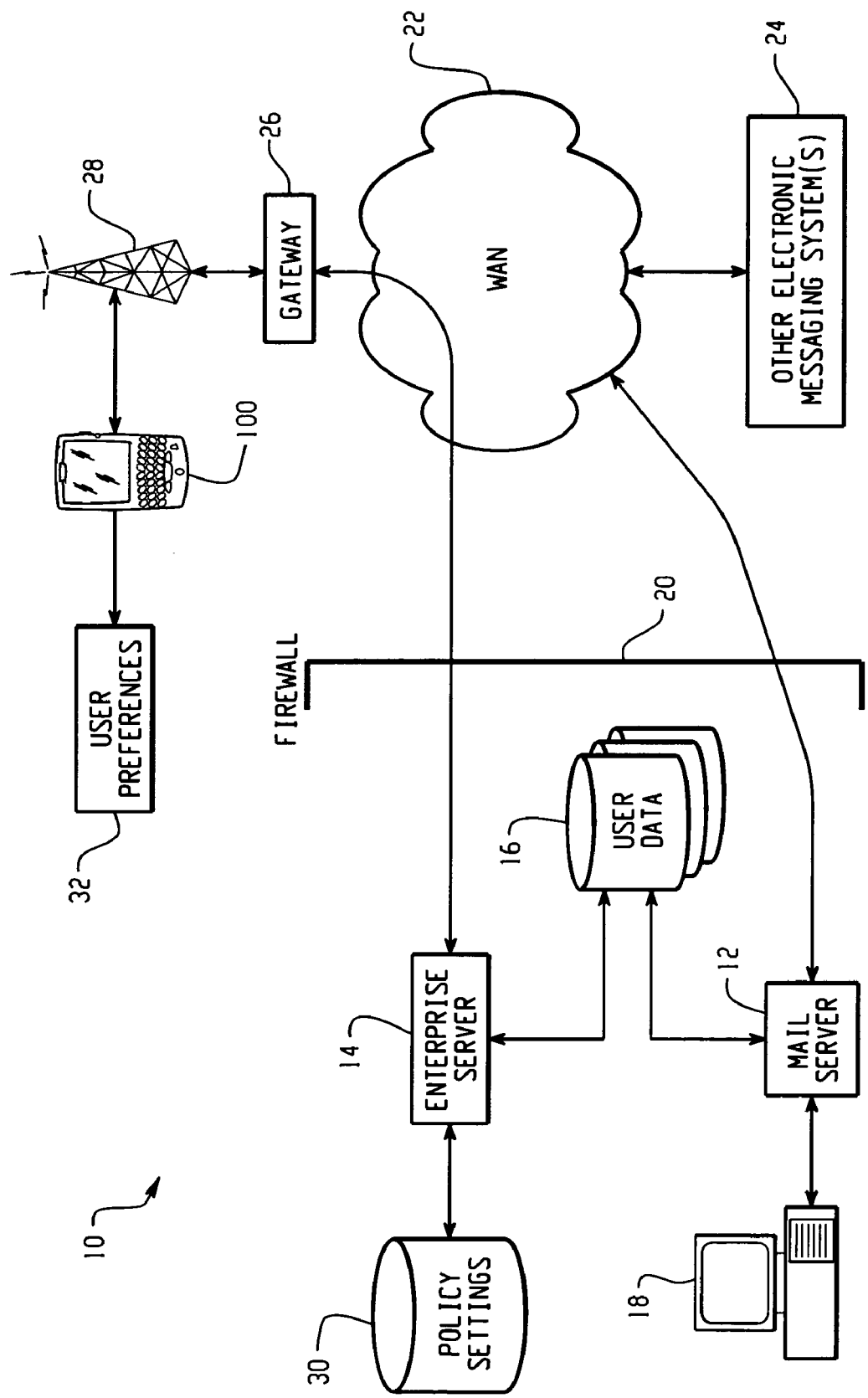
FIG. 1 is a system diagram of a system for remotely locating a lost mobile communication device.

Turning now to the drawing figures, which describe an example of the invention described in this application, FIG. 1 is a system diagram 10 of a system for remotely locating a lost mobile communication device. The example system 10 includes an enterprise server 14, a mail server 12, a storage medium 16 for electronic messaging (e-mail) account data, and a wireless gateway 26. Also illustrated are the mobile communication device 100, including memory for storing user preferences 32, a wireless network 28, a wide area network (WAN) 22, a firewall 20, a desktop client 18, and one or more other electronic messaging systems 24.

The mail server 12 may include electronic messaging software executing on a computer within a local area network (LAN). The mail server 12 is coupled to local network devices 14, 16, 18 via the LAN, and is coupled to remote network devices 24 via the WAN 22. The LAN and WAN 22 may be separated by a firewall 20.

The mail server 12 maintains an electronic mail (e-mail) account within the e-mail account database 16 for each desktop client 18 in the LAN. The e-mail account database 16 may be one or more storage devices coupled to the mail server 12, and may be included within the same network device as the mail server 12 or in one or more separate devices within the LAN. The desktop client 18 may be one of a plurality of computers (e.g., personal computers, terminals, laptop computers, or other processing devices) coupled to the mail server 12 via the LAN that execute electronic messaging software to send and receive electronic messages (e-mail) via the mail server.

Electronic messages sent from the desktop client 18 are stored by the mail server 12 in an outgoing message storage location (an "outbox") within a corresponding e-mail account 16. If the outgoing message is addressed to an e-mail account within the LAN, then the mail server 12 delivers the message to an incoming message storage location (an "inbox") in the appropriate e-mail account 16. If the outgoing message is addressed to an e-mail account in another electronic messaging system 24, however, then the message is delivered via the WAN 22. Similarly, incoming electronic mail (e-mail) addressed to the e-mail account 16 is received by the mail server 12 and stored to the e-mail account database 16 within the appropriate incoming message storage location ("inbox"). The incoming e-mail may then be retrieved from the e-mail account 16 by the desktop client 18, or may be automatically pushed to the desktop client 18 by the mail server 12.

The enterprise server 14 may include electronic mail (e-mail) redirection software executing on a computer within the LAN. The enterprise server 14 is operational to redirect electronic mail messages (e-mail) from the e-mail account 16 to the mobile communication device 100 and to place messages sent from the mobile communication device 20 into the e-mail account 16 for delivery by the mail server 12. The enterprise server 14 stores mobile device information, such as a wireless identification (e.g., a PIN), used to communicate with the mobile communication device 100. The enterprise server 14 may, for example, communicate with the mobile communication device 100 using a direct TCP/IP level connection with the wireless gateway 26, which provides an interface between the WAN 22 and the wireless network 28.

When an electronic message (e-mail) is received in the inbox of the e-mail account 16, the e-mail is detected by the enterprise server 14, and a copy of the message and any necessary mobile device information are sent over the WAN 22 to the wireless gateway 26. For example, the enterprise server 14 may encapsulate a copy of the message into one or more data packets along with a wireless identification (e.g., a PIN) for the mobile communication device 100, and transmit the data packet(s) to the wireless gateway 26 over a direct TCP/IP level connection. The wireless gateway 26 may then use the wireless identification and/or other mobile device information to transmit the data packets(s) containing the electronic message over the wireless network 28 to the mobile communication device 100.

The enterprise server 14 is also coupled to a policy settings data store 30, which provides provisioning data for the mobile communication devices 100 served by the system 10. A central site administrator sets, resets, alters and/or manages the provisioning data 30 in order to control the delivery of redirection services to the devices 100 which are in communication with the enterprise server 14. One such policy setting is a lost device policy. This policy setting may be activated by a central site administrator, or by some other party, either directly through interaction with the enterprise server 14, or indirectly by transmitting policy setting data to the enterprise server 14 from some remote location.

The lost device policy setting may be activated when a user of a mobile device 100 reports that its device is lost. This setting is particularly useful in the situation where the user of the lost mobile device 100 has disabled device notifications such that the user could not send a message (or place a call) to the lost device to make it reveal its location. Although the preferred method of activating the lost device policy is through a central site administrator managing the policy setting database 30, alternatively a user of the lost device could send an electronic communication to the enterprise server to cause the lost policy setting to be activated. This electronic communication could be an e-mail message, a voice message, etc.

Regardless of how the lost policy setting is activated, following activation the enterprise server 14 will transmit a remote location command to the lost mobile device 100. The mobile device receives the remote location command and, in response thereto, may: (1) alter the user preferences 32 set by the user to enable notifications, or (2) may execute a location mechanism, such as activating an audible or visible alert mechanism on the device 100, or (3) may transmit location data back to the enterprise server 14, such as network data used to triangulate the location of the device 100 or GPS data from an on-board GPS receiver. In the first instance, once the user preferences 32 have been altered so as to enable notifications, the user of the mobile device 100 can then subsequently call or send a communication to the mobile device 100, thereby causing an alert mechanism such as an audible signal to be activated. In this way the user can then locate the lost device 100. In the second instance, the user preferences are preferably not altered (i.e., the notifications are still disabled in the user preferences store 32) but they are effectively overridden by activating one or more alerting mechanisms, and subsequently re-activating the one or more alerting mechanisms until the user finds the lost device. Having found the device 100, the user may then be prompted by the device to indicate it has been found, such as by clicking a key or entering security credentials into the found device 100. At this point, the re-activating of the alerting mechanism would be stopped.

Electronic messages sent from the mobile communication device 100 may be encapsulated into one or more data packets along with a network identification for the enterprise server 14 and then transmitted over the wireless network 28 to the wireless gateway 26. The wireless gateway 26 may use the network identification for the enterprise server 14 to forward the data packet(s) over the WAN 22 to the enterprise server 14, preferably via a direct TCP/IP level connection. Upon receiving the data packet(s) from the wireless gateway 26, the enterprise server 14 places the enclosed electronic message (e-mail) into the outbox of the associated e-mail account 16. The mail server 12 then detects the e-mail in the outbox and delivers the message, as described above.

Security may be maintained outside of the firewall 32 by encrypting all electronic messages sent between the enterprise server 14 and the mobile communication device 100. Command data, such as the remote location command discussed above, may also be encrypted. For instance, an electronic message to be redirected to the mobile communication device 100 may be encrypted and compressed by the enterprise server 14, and the encrypted message may then be encapsulated into one or more data packets for delivery to the mobile communication device 100. To maintain security, the electronic message may remain encrypted over the entire communication path 22, 26, 28 from the enterprise server 14 to the mobile communication device 100. Similarly, electronic messages sent from the mobile communication device 100 may be encrypted and compressed by the mobile communication device 100 before being packetized and transmitted to the enterprise server 14, and may remain encrypted over the entire communication path 28, 26, 22 from the mobile communication device 100 to the enterprise server 14.

Figure 2:
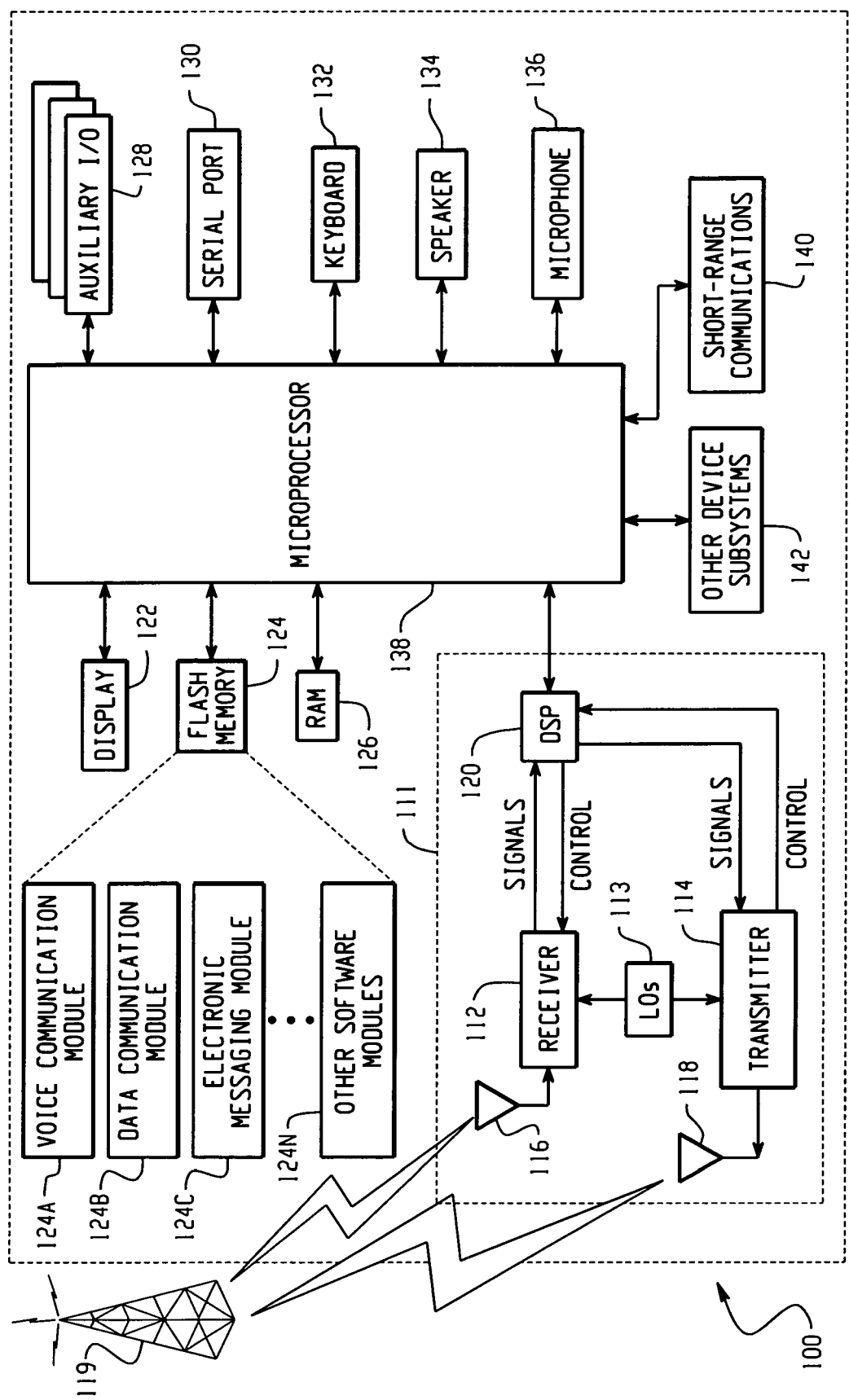
FIG. 2 is a block diagram of an exemplary mobile communication device that may operate in conjunction with the system disclosed in FIG. 1.

FIG. 2 is a block diagram of an exemplary mobile communication device 100 that may be used in conjunction with the system discussed above. The mobile communication device 100 includes a processing subsystem 138, a communications subsystem 111, a short-range communications subsystem 140, a memory subsystem 124, 126, and various other device subsystems and/or software modules 142. The mobile communication device 100 also includes a user interface, which may include a display 122, a serial port 130, keyboard 132, a speaker 134, a microphone 136, one or more auxiliary input/output devices 128, and/or other user interface devices.

The processing subsystem 138 controls the overall operation of the mobile communication device 100. Operating system software executed by the processing subsystem 138 may be stored in a persistent store, such as a flash memory 124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 126. Communication signals received by the mobile communication device 100 may also be stored to RAM 126.

The processing subsystem 138, in addition to its operating system functions, enables execution of software applications 124 on the device 100. A predetermined set of applications that control basic device operations, such as data and voice communications, may be installed on the device 100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 119.

Communication functions, including data and voice communications, are performed through the communication subsystem 111, and possibly through the short-range communications subsystem 140. The communication subsystem 111 includes a receiver 112, a transmitter 114 and one or more antennas 116, 118. In addition, the communication subsystem 111 also includes a processing module, such as a digital signal processor (DSP) 120 or other processing device(s), and local oscillators (LOs) 113. The specific design and implementation of the communication subsystem 111 is dependent upon the communication network in which the mobile communication device 100 is intended to operate. For example, a mobile communication device 100 may include a communication subsystem 111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile communication devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile communication device 100 may send and receive communication signals over the communication network 119. Signals received by the antenna 116 from the communication network 119 are routed to the receiver 112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 119 are processed (e.g., modulated and encoded) by the DSP 120 and are then provided to the transmitter 114 for digital to analog conversion, frequency up conversion, filtering, amplification and transmission to the communication network 119 (or networks) via the antenna 118.

In addition to processing communication signals, the DSP 120 provides for receiver 112 and transmitter 114 control. For example, gains applied to communication signals in the receiver 112 and transmitter 114 may be adaptively controlled through automatic gain control algorithms implemented in the DSP 120.

In a data communication mode, a received signal, such as a text message or web page download, is processed by the communication subsystem 111 and input to the processing device 138. The received signal is then further processed by the processing device 138 for output to a display 122, or alternatively to some other auxiliary I/O device 128. A device user may also compose data items, such as e-mail messages, using a keyboard 138 and/or some other auxiliary I/O device 128, such as a touchpad, a rocker switch, a thumb-wheel, or some other type of input device. The composed data items may then be transmitted over the communication network 119 via the communication subsystem 111.

In a voice communication mode, overall operation of the device is substantially similar to the data communication mode, except that received signals are output to a speaker 134, and signals for transmission are generated by a microphone 136. Alternative voice or audio I/O subsystems, such as a voice message recording subsystem, may also be implemented on the device 100. In addition, the display 122 may also be utilized in voice communication mode, for example to display the identity of a calling party, the duration of a voice call, or other voice call related information.

The short-range communications subsystem 140 enables communication between the mobile communication device 100 and other proximate systems or devices, which need not necessarily be similar devices. For example, the short-range communications subsystem 140 may include an infrared device and associated circuits and components, or a Bluetooth™ communication module to provide for communication with similarly-enabled systems and devices.

The mobile device 100 may include a variety of notification mechanisms, such as a speaker 134 and a display 122. The speaker 134 can be used to indicate an incoming phone call or a received data item by sounding an audible alert, and the display 122 can be used to indicate the same by causing a visible alert on the display 122. The user preferences 32 shown in FIG. 1 may be stored in the flash memory 124 of the device 100, and may be configured and re-configured by a user of the device via the keyboard 132 and auxiliary I/O 128 mechanisms.

Figure 3:
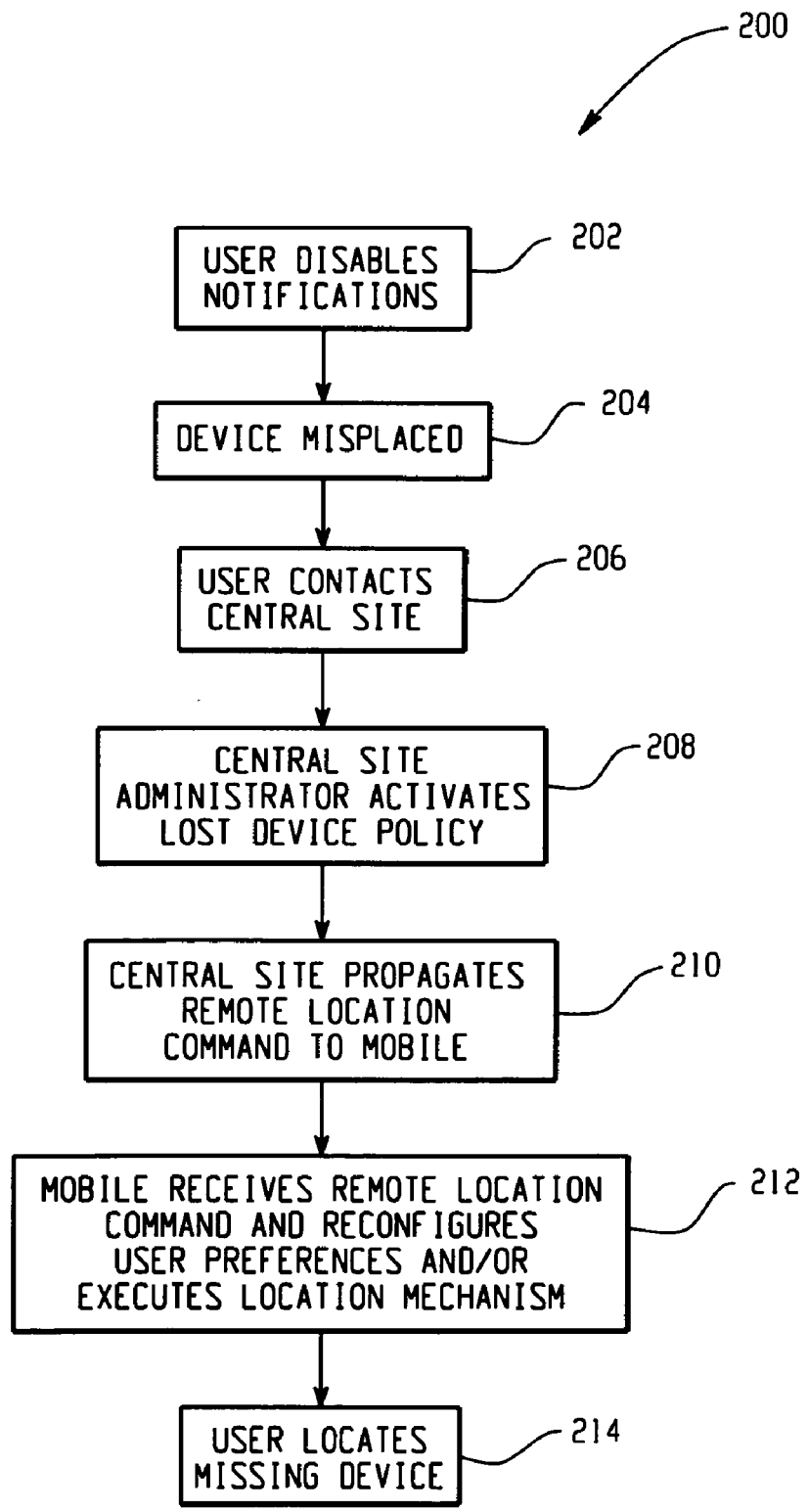
FIG. 3 is a flow diagram of an exemplary method of remotely locating a lost mobile communication device.

FIG. 3 is a flow diagram 200 of an exemplary method of remotely locating a lost mobile communication device 100. In step 202 a user of the device 100 has disabled notifications, and in step 204 the device is subsequently misplaced. The user then contacts the central site administrator at the enterprise server 14 to indicate that the device 100 is misplaced. Contact with the enterprise server 14 may come through a telephone call, electronic message, or other form of communication with the central site administrator. Alternatively, the central site administrator may be bypassed and the user in step 206 may communicate directly to the enterprise server 14 via electronic communication. Having reported the lost device in step 206, the lost device policy for the particular device 100 is then set in the policy settings database 30 of the enterprise server 14. This setting causes the enterprise server 14 to then propagate by wireless transmission the remote location command to the mobile device 100 in step 210. The misplaced mobile device then receives the remote location command in step 212 and takes action to make the device locatable by the user. Several ways of making the device locatable include: (1) reconfiguring the user preferences of the device 100 so that notifications (i.e., audible, visible or tactile alerts) are enabled; (2) causing the mobile device 100 to directly execute a notification, and then subsequently re-executing the notification signal until the device is located by the user; (3) causing the mobile device 100 to transmit network data to the enterprise server 14 which may be used to triangulate the location of the misplaced device; or (4) causing the mobile device 100 to transmit GPS data to the enterprise server. Other ways of making the device locatable are also possible. Finally, in step 214, the user locates the misplaced mobile device in response to the actions in step 212.

The above-described embodiments of the invention are intended to be examples only. Those of skill in the art may effect alterations, modifications and variations to the particular embodiments described herein.

What is claimed:

1. A method of locating a lost wireless communication device in which user preferences of the lost wireless communication device have been configured to disable device notifications, comprising the steps of:
    contacting a remote server and indicating that the wireless communication device is lost;
    activating a lost device policy setting in a database coupled to the remote server, the lost device policy setting indicating that the wireless communication device is lost;
    in response to activation of the lost device policy setting, transmitting a remote location command from the remote server to the wireless communication device via a wireless network; and
    receiving the remote location command at the lost wireless communication device and processing the remote location command by reconfiguring the user preferences of the wireless communication device to enable device notifications such that a user of the wireless communication device can locate the device.

2. The method of claim 1, wherein the contacting step comprises the step of: placing a telephone call to a central site administrator of the remote server; or sending an electronic message to the central site administrator of the remote server; or sending an electronic message directly to the remote server.

3. The method of claim 1, wherein the remote location command is transmitted by the remote server over a wide area network which couples the remote server to the wireless network.

4. The method of claim 1, wherein the device notifications include an audible alert, a visible alert and/or a tactile alert responsive to receipt of a wireless communication.

5. The method of claim 1, wherein the processing step comprises executing a device notification.

6. The method of claim 5, wherein the processing step further comprises re-executing the device notification until the wireless communication device is found by its user.

7. The method of claim 6, further comprising the step of prompting the user of the wireless communication device to disable the re-executing step.

8. The method of claim 1, wherein the processing step comprises obtaining wireless network information pertaining to the location of the wireless communication device and transmitting the wireless network information to the remote server.

9. The method of claim 8, further comprising the step of the remote server processing the wireless network information transmitted from the wireless communication device in order to determine the location of the lost wireless communication device.

10. The method of claim 1, wherein the processing step comprises transmitting GPS data to the remote server, the GPS data indicating the present location of the wireless communication device.

11. A method of locating a wireless communication device in which user preferences of the lost wireless communication device have been configured to disable device notifications, comprising the steps of:
  contacting a remote server and indicating that the wireless communication device is lost;
  transmitting a remote location command from the remote server to the wireless communication device via a wireless network; and
  receiving the remote location command at the wireless communication device and reconfiguring the user preferences of the wireless communication device to enable device notifications upon receiving a communication at the wireless communication device.

12. The method of claim 11, further comprising:
  activating a lost device policy setting in a database coupled to the remote server, the lost device policy setting indicating that the wireless communication device is lost; and
  in response to the setting of the lost device policy in the database, carrying out the transmitting a remote location command step.

13. The method of claim 11, wherein the contacting step comprises the step of: placing a telephone call to a central site administrator of the remote server; or sending an electronic message to the central site administrator of the remote server; or sending an electronic message directly to the remote server.

14. The method of claim 11, wherein the remote location command is transmitted by the remote server over a wide area network which couples the remote server to the wireless network.

15. The method of claim 11, wherein the device notifications include an audible alert, a visible alert and/or a tactile alert responsive to receipt of a wireless communication.

16. The method of claim 11, further comprising executing a device notification upon receiving the communication.

17. The method of claim 16, further comprising re-executing the device notification until the wireless communication device is found by its user.

18. The method of claim 17, further comprising prompting the user of the wireless communication device to disable the re-executing step.

19. The method of claim 11, further comprising obtaining wireless network information pertaining to the location of the wireless communication device and transmitting the wireless network information to the remote server.

20. The method of claim 19, further comprising the remote server processing the wireless network information transmitted from the wireless communication device in order to determine the location of the lost wireless communication device.

21. The method of claim 11, further comprising transmitting GPS data to the remote server, the GPS data indicating the present location of the wireless communication device.

* * * * *